United States Patent [19]

Kohle et al.

[11] 4,389,449

[45] Jun. 21, 1983

[54] CARBON FILM

[76] Inventors: Ulrich Kohle, Tiefenauweg 17, D-3167 Burgdorf; Hans Paffhausen, Tiergartenstrasse 17 A, D-3000 Hannover, both of Fed. Rep. of Germany

[21] Appl. No.: 219,090

[22] Filed: Dec. 22, 1980

[30] Foreign Application Priority Data

Dec. 21, 1979 [DE] Fed. Rep. of Germany ....... 2951618

[51] Int. Cl.$^3$ .......................... B32B 3/00; B32B 5/16; B41M 3/10; B41L 1/16

[52] U.S. Cl. ....................................... 428/203; 282/14; 282/19 R; 282/28 R; 427/153; 428/204; 428/205; 428/207; 428/914

[58] Field of Search ............... 428/203, 204, 205, 201, 428/207, 914; 427/141, 153; 282/14, 19 R, 28 R

[56] References Cited

U.S. PATENT DOCUMENTS

| | | | |
|---|---|---|---|
| 4,065,158 | 12/1977 | Davis | 427/153 |
| 4,112,178 | 9/1978 | Brown | 427/153 X |
| 4,254,173 | 3/1981 | Peer, Jr. | 428/204 |

*Primary Examiner*—Thomas J. Herbert, Jr.
*Attorney, Agent, or Firm*—Manfred M. Warren; Robert B. Chickering; Glen R. Grunewald

[57] ABSTRACT

The subject is a carbon film, which consists of a transparent plastic film as base, a coloring, dark pigmented carbon layer, and a thin intervening layer located between the base and the carbon layer. Such a carbon film can be used as "carbon paper" or for the production of typewriter ribbons. The intervening layer contains synthetic lustrous pigments, color-doped as necessary, whereby the back of the film acquires an excellent coloring, without requiring a special covering layer for it.

3 Claims, No Drawings

CARBON FILM

BACKGROUND OF THE INVENTION

The invention concerns a carbon film, consisting of a colorless plastic film as base, a coloring carbon layer and a thin intervening layer located between the base and the carbon layer.

Carbon films of this type serve in sheet form for the production of copies when an original is typed in a typewriter, or as typewriter ribbons. In the sense of the invention the term "carbon layer" is to be understood in the broadest sense and is to include all those layers which contain lampblack or other pigments or e.g. magnetic pigments, insofar as the latter possess a sufficiently dark color.

In principle it is desirable to prepare the back of the finished product for accepting graphics, texts and graphic and verbal representations of different types. This presupposes an appropriate coloring of the back of the film, which cannot be attained at all simply, since the coloring side of the carbon paper is deep black.

In the past, paper was used as the base of the carbon layer in the production of copies, and in order to design the back of the paper, a covering layer with a desired color was applied, whereby it was next necessary to print the desired graphic and verbal representations on the covering layer in an additional operation. Of course, in the use of paper as a base for the carbon layer, an additional coating of the back was necessary anyway, because only in this way could the paper, having been provided with the carbon layer, be prevented from rolling because of unbalanced tensions in the coating, thus making practical use more difficult.

Recently paper has been replaced as the base by transparent plastic film, in the case of which the danger of rolling up does not arise, so that, as far as this is concerned, an additional coating of the back is no longer necessary. This raises the possibility of using the back of the film directly as an advertising medium of special value, if it can be successfully finished, not only graphically but also in color.

In the use of plastic film it is necessary and usual to apply an intervening layer as well to improve the adhesion of the carbon layer. This intervening layer, which is usually prepared to be antistatic as well, has a thickness of only about 2 to 10 microns. Because of this slight thickness of the intervening layer, however, one cannot avoid having the carbon material impinge on this layer or strike through it, whereby the back of the film presents an unattractive appearance, being largely dull black. The same effect arises when the intervening layer is pigmented with usual pigments, i.e. even then no color effect appears on the back of the film. For this reason, up until now a covering layer has been applied to the back of the film for optical reasons, even with carbon film, in which case it was also necessary to apply any lettering afterward in an additional operation, after the application of the covering layer.

SUMMARY OF THE INVENTION

The problem of the invention is to create a carbon sheet which offers a back appearance with attractive coloring without an additional covering layer, and which can be produced in a simple manner and economically.

The problem is solved by the invention in the case of a carbon film of the type first named by having the intervening layer contain synthetic lustrous pigments.

Synthetic lustrous pigments are in themselves familiar, e.g. in the plastics, paint and cosmetic industries. They are microscopic, predominantly flat-shaped particles, which can be oriented in thinly applied layers largely parallel to the surface, and they are exceptional in that they are transparent and thus show multiple reflection when oriented parallel. Thus effects can be attained with them that are very similar to the luster of natural pearl, for periodically alternating layers of transparent material with varying index of refraction are, for example, the characteristic structure of pearls. Thus an important presupposition for the effect of synthetic lustrous pigments is that they show a high index of refraction. An example for such synthetic lustrous pigments are small sheets of mica, which are vaporized with layers of titanium dioxide which are colordoped as desired. The titanium dioxide possesses an index of refraction of 2.4 to 2.8.

The effect of a lustrous pigment layer rests on the interference colors created by refraction and depends on the color of the background. On a light-colored background, its color is reflected, so that the intensity of the reflected color is thereby weakened and hardly has any effect. On a dark background the luminosity of the reflected color is greatest, since the light which comes through is absorbed.

The addition of lustrous pigments to the intervening layer of a carbon film leads to a surprising effect. While previously the striking through of the carbon layer had the undesired effect of making the back of the film unattractively black and for that reason this effect had to be removed by an additional coating, the striking through of the carbon layer into an intervening layer loaded with lustrous pigments has the effect of creating the intimate contact with a dark background necessary for the effect of the lustrous pigments, so that as a result the back of the film appears uniformly lustrous in the reflected color and acquires an excellent appearance. The additional coating of the back of the film which was necessary up to now can therefore be omitted, and the film can be printed on the back even before it is coated, whereby the lustrous pigments make the printed legend especially effective.

For the production of the carbon film, the invention yields a quite significant simplification. Thus the printing process can take place in the course of production of the transparent film, which is significantly simpler than the previous method, in which the film first had to be coated in a separate operation. The further and significantly more important simplification does, however, lie in the fact that the operation of coating the back of the film is omitted.

DETAILED DESCRIPTION OF THE INVENTION

An example of the invention is the following:

A carbon film was produced, in which the intervening layer had a traditional and usual composition, except for the lustrous pigments. In the example under consideration the intervening layer was composed of 35 parts by weight of polyester, 63 parts by weight of methyl ethyl ketone and 2 parts by weight of an antistatic material, and was applied to the film in a layer of thickness 4 microns. Before application, however, 15% more by weight of color-doped lustrous pigments were worked into the material of the intervening layer. By means of this the intervening layer acquired a slightly opaque appearance, but the film remained practically colorless and transparent. After the application of the carbon layer (of usual composition) to this intervening layer there appeared on the back of the film a clear and pure, radiant and lustrous color in the shade given by the particular color-doping of the lustrous pigments. The lustrous pigments used were, by way of example, the types provided by the firm of E. Merck in Darmstadt, Iriodin Color G Ti 100 for green
Iriodin Color B Ti 100 for blue
Iriodin Color R Ti 100 for red
Iriodin Color Y Ti 100 for gold
Iriodin Rutil-Silber 100 for silver
Iriodin Colibri rotbraun for redbrown It was further found that the depth of tone of the color of the back of the film becomes lighter with increasing layer thickness (e.g. 6 microns) and becomes darker with decreasing layer thickness (e.g. 2 microns).

What is claimed is:

1. Carbon film, consisting of a transparent plastic film as base, a coloring carbon layer and a thin intervening layer located between the base and the carbon layer, wherein the intervening layer contains synthetic lustrous pigments.

2. Carbon film according to claim 1, wherein the proportion by weight of lustrous pigments in the intervening layer is about 10 to 20%.

3. Carbon film according to claim 1 or 2, wherein a plastic film printed before application of the carbon layer and the intervening layer is used as the base.

* * * * *